United States Patent [19]

Hoffman et al.

[11] Patent Number: 5,186,742
[45] Date of Patent: Feb. 16, 1993

[54] METHOD AND COMPOSITION FOR USE IN RECYCLING METAL CONTAINING FURNACE DUST

[75] Inventors: David C. Hoffman, Ft. Worth; Norman L. Hains, Arlington, both of Tex.

[73] Assignee: Chemical Lime Company, Fort Worth, Tex.

[21] Appl. No.: 799,407

[22] Filed: Nov. 27, 1991

[51] Int. Cl.$^5$ .............................................. C21B 1/24
[52] U.S. Cl. ....................................... 75/773; 75/772
[58] Field of Search ................................. 75/773, 772

[56] References Cited

U.S. PATENT DOCUMENTS

| | | | |
|---|---|---|---|
| 854,527 | 5/1907 | Pollacsek | 75/772 |
| 2,865,731 | 12/1958 | Crowe | 75/772 |
| 2,867,525 | 1/1959 | Lovenstein | 75/773 |
| 3,374,085 | 3/1968 | Stone | 75/773 |
| 3,617,254 | 11/1971 | Imperato | 75/773 |
| 3,652,260 | 3/1972 | Azami | 75/3 |
| 4,407,672 | 10/1983 | Deuschle et al. | 75/10 R |
| 4,758,268 | 7/1988 | Bishop et al. | 75/25 |
| 4,836,847 | 6/1989 | Bishop et al. | 75/25 |
| 4,840,671 | 6/1989 | Lynn et al. | 106/85 |
| 4,900,356 | 2/1990 | Hoffman | 75/35 |
| 4,911,757 | 3/1990 | Lynn et al. | 106/85 |

OTHER PUBLICATIONS

Charles J. LaBee, *Electric Arc Furnace Dust Symposium*, Iron and Steel Engineer, Jan. 1990, pp. 61–64.
T. P. McAlloon, *Decision Time for EAF Dust Generators*, Iron & Steelmaker Staff, Feb. 1990, pp. 15–20.
George J. McManus, *Closing The Loop On Arc Furnace Dust*, Iron Age, Feb. 1990, pp. 36–37.

Primary Examiner—Peter D. Rosenberg
Attorney, Agent, or Firm—Charles D. Gunter, Jr.

[57] ABSTRACT

A process is shown where an arc dust waste produced by an electric arc furnace is conducted to silos and converted to a reusable co-product by means of the addition of a special blend of high calcium and dolomitic quicklime, calcium stearate and pulverized waste paper. The mixture is compressed into compact pellets which, due to their impact integrity and improved shelf life can be pneumatically conveyed intact into storage silos for recycling of the waste electric arc flue dust into the furnace melt. Components of the arc dust deemed leachable and hazardous in landfills, such as zinc, lead and chromium are increased in concentration to a point where it is economical to extract them for resale.

12 Claims, 1 Drawing Sheet

METHOD AND COMPOSITION FOR USE IN RECYCLING METAL CONTAINING FURNACE DUST

BACKGROUND OF THE INVENTION

1. Field of the Invention

The present invention relates generally to a method and composition for recovering metal values from flue dust and has particular utility for the steel industry where the control of furnace emissions is necessary.

2. Description of the Prior Art

In the production of certain grades of steel in this country, an Electric Arc Furnace (EAF) is used. The EAF process will be familiar to those skilled in the art. In a typical operation, solid charge ingredients including raw scrap, limestone, burnt lime, iron ore and ferro alloy additives are charged to a furnace. Furnaces in common use include the so-called "top charge" units. Such furnaces are equipped with a roof swing which permits the roof to swing aside when cold scrap is charged; a rocker/rail tilting arrangement which allows the furnace to tilt forward for tapping and backward for slagging; means for supplying additions through the furnace roof; and evacuation means for removing dust generated during the steel making procedure.

Electrodes are typically supported overhead and project downwardly through the furnace roof. The electrodes produce an electric arc which surges between the electrodes and scrap and produces heat which melts the charge and refines the steel. The molten steel is tapped at about 3,000° F. into a ladle and is cast into blooms or poured into ingot molds.

Particulate emissions are generated at several points during the process. For instance, such emissions are generated during charging of the scrap, during tapping of the furnace, during pneumatic injection of additives, during oxygen blowing, as well as during melt down periods. Customarily in the industry, the EAF dust is collected in baghouses. Recent EPA rulings have determined that such inorganic dust constitutes a hazardous waste. As a result, the disposal of such collected dust presents an ever increasing problem and it has become mandatory to find suitable environmentally accepted methods of dust disposal.

One approach to the present problem is to reutilize the metal values present in the dust, such as zinc, lead, cadmium and chromium, to increase the concentration of such metal values to the point where it is economical to extract the metal values. Thus, repeated recycling of the arc dust results in a buildup of zinc, lead, cadmium and chromium concentrations in subsequently generated arc dust so that the concentrate may be economically recovered and sold, for example, in ingot form. Such a process substantially reduces the need for transfer of the arc dust to a certified landfill which must be monitored for leachate concentrations meeting EPA standards.

In order to successfully recycle the EAF dust to the furnace, it is generally necessary to bind, agglomerate or encapsulate the dust in some manner. Direct re-injection of the untreated dust tends to further pollute the work place. Certain of the prior art processes have attempted to pelletize the dust in order to enhance its storage and handling characteristics. For example, U.S. Pat. No. 4,407,672, issued Oct. 4, 1983, to Deuschle et al., contains a discussion of the production of "green ball" pellets made from EAF dust. Although such pellets have been successfully utilized in recycling processes of the type described, they typically involve a chemical bonding or agglomerating reaction which requires a predetermined cure time. Also, the previously known pellets have lacked the requisite degree of mechanical strength and, as a result, have been difficult to store or have partially disintegrated during transit and reinjection into the furnace.

A need thus exists for an improved method and composition for recycling metal containing EAF dust to produce a product having a saleable value while sparing the environment of a hazardous waste which must be confined at great expense or treated by other acceptable means of rendering the waste non-toxic.

A need also exists for such a process in which waste dust is pelletized in order to be recycled to the EAF furnace for concentration to a level which makes metal extraction more economical.

A need also exists for such a process and composition which does not require a cure time or a calcining step and which produces a product with improved mechanical strength over processes currently available which involve the incorporation of lime into pellets.

SUMMARY OF THE INVENTION

In the method of the present invention, a blend is prepared containing from about 10 to 40% by weight of metal contaminated furnace dust with from about 85 to 55% by weight lime, from about 0.1 to 1.0% by weight paper fiber (cellulose) and from about 0.1 to 1.0% by weight of a lubricant selected from the group consisting of aliphatic hydrocarbons derived from petroleum (paraffins), alkaline earth metal stearates, fatty acids and stearic acid to form a powder blend. Preferably, the powder blend is pelletized by mechanically compressing the blend into pellet-shaped die pockets in a mold. Alternatively, the blend may be extruded into pellets. The pellets are then returned to the furnace as a part of the charge.

Preferably, the powder blend comprises a dolomitic lime blend having a magnesium oxide content of from about 2 to 12% by weight and a calcium oxide content of from about 88 to 98% by weight. The lime component is preferably present in the range from about 85 to 55% by weight of the final powder blend, the metal contaminated furnace dust comprising approximately 10 to 40% by weight of the final powder blend. Paper fiber and alkaline earth metal stearate lubricant preferably comprise from about 0.2 to 4% by weight of the final powder blend. The pellets so formed have a crush strength in the range from about 100 to 350 pounds and a drop height survival of from about 7 to 20 feet. The most preferred alkaline earth metal stearate used in forming the powder blend is calcium stearate.

Additional objects, features and advantages will be apparent in the written description which follows.

DETAILED DESCRIPTION OF THE INVENTION

Figure 1:
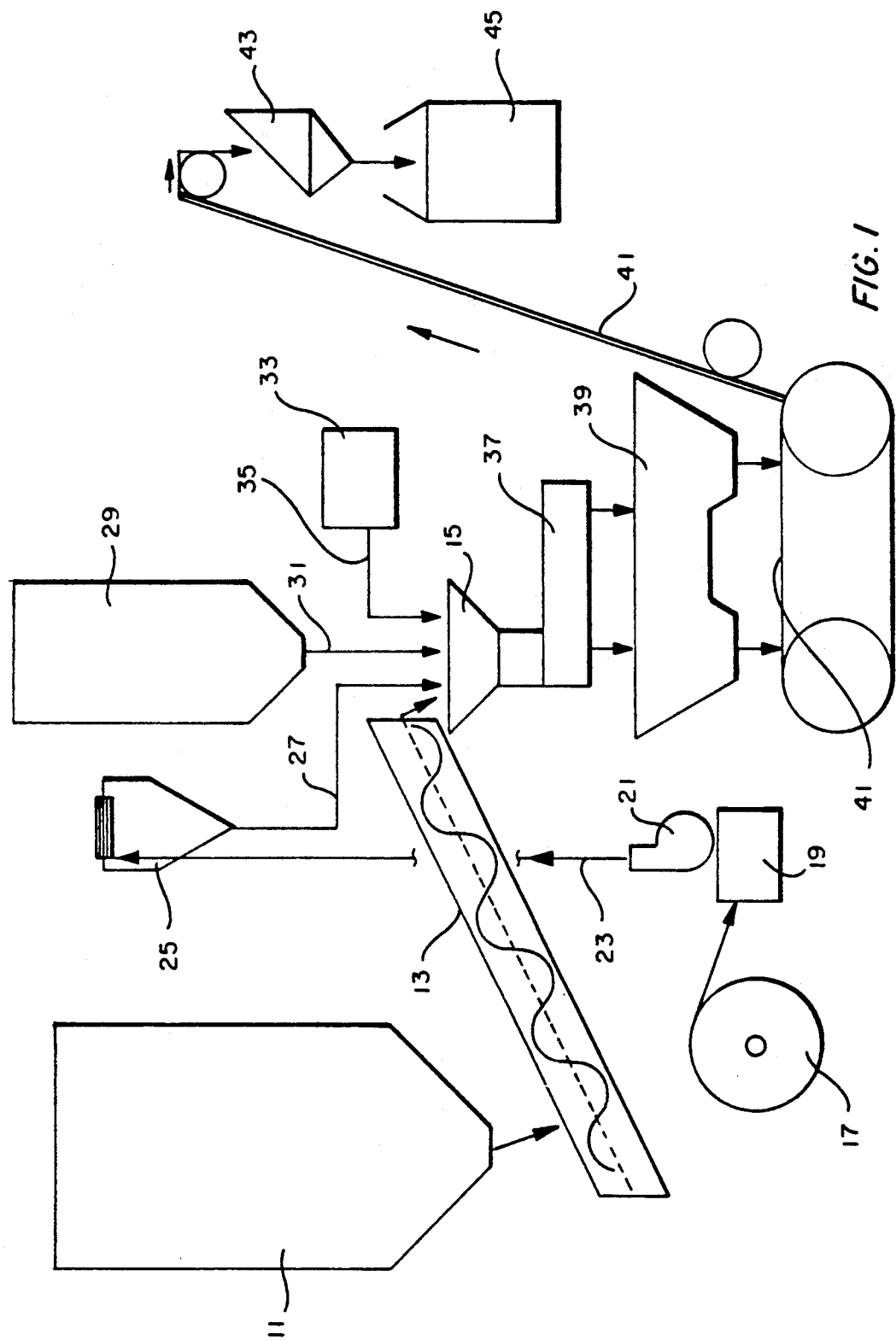
FIG. 1 is a schematic view of the process used to produce the EAF dust pellets of the invention.

In the method of recycling metal containing furnace dust contaminated with heavy metals and oxides, a blend is first prepared of lime, metal contaminated furnace dust and a special binder made by combining a lubricant with specially prepared paper fiber. This mixture can be compressed into a very compact pellet of high impact integrity and long shelf life which can be pneumatically conveyed intact into storage silos for recycling of waste EAF dust into the furnace melt. In this way, components of the EAF dust deemed leachable and hazardous in landfills, such as, but not limited to, zinc, lead and chromium may be increased in concentration to a point where it is economical to extract the zinc, lead and chromium for resale.

The EAF dust which is generated in the steel making process is generally collected in a pollution control device, such as an electrostatic precipitator or a baghouse filtration system. The dust or fume which is recovered from the steel making operation consists of fine particles, including metallic and non-metallic compounds, such as iron oxide, zinc oxide, lead oxide, sulfur compounds, carbon, silicon dioxide, aluminum oxide, calcium oxide, magnesium oxide, and the like. As discussed above, because of the presence of such particles, the dust or fume is generally considered to be a hazardous waste, the disposal of which has presented problems in the prior art. In order to place the fume or dust in a more convenient form which is more readily disposable or recyclable, the dust is blended into a special powder blend and pelletized using the method as described below. The EAF dust is generally present in the powder blend in the range from about 10 to 40% by weight, based on the total weight of the powder blend.

The preferred lime component is selected from among the commercially available high calcium and/or dolomitic limes and blends thereof. Preferably, the lime component of the invention is a lime blend containing from about 2 to 12% by weight magnesium oxide and from about 88 to 98% by weight calcium oxide. The lime component is preferably present in the range from about 85 to 55% by weight, most preferably about 75% by weight of the final powder blend.

The fibrous component of the blend is preferably paper fiber prepared, for example, by pulverizing waste paper. The paper stock can be prepared by pulverizing and shredding heavy Kraft longstock paper of the type containing long strand fiber suitable for use in cardboard carton manufacture. The paper stock, lightly refined at the paper mill, is knocked down to the cellulose longstock fiber prior to incorporation into the powder blend. The fibrous component provides mechanical binding and shock absorbent characteristics to the pellets. The shredded paper component is present in the range from about 0.1 to 2.0% by weight of the total blend. The paper fibers manufactured by shredding Kraft paper are typically 1 to 4 mm in length. These lengths render best binding results.

In order to improve the shelf life properties of the pellets (briquettes) while providing lubrication for the pelletizing operation, a special lubricant is included in the powder blend. The lubricant compliments the pulverized-long fibered paper stock which provides mechanical binding and shock absorbent characteristics to the pellets and enhances handling characteristics. The lubricant is a compound selected from the group consisting of alkaline earth metal stearates, fatty acids, paraffins, and stearic acid. The preferred lubricants are selected from among the alkaline earth metal stearates and included among the preferred alkaline earth metal stearates are calcium stearate and magnesium stearate. A preferred calcium stearate powder is commercially available and has the following published characteristics:

| | PROPERTIES | |
|---|---|---|
| | Specifications | Typical |
| Assay (as CaO) | 9.0–10.5% | 9.7 ± 0.2% |
| Free Fatty Acid | 1.0% max. | 0.2 ± 0.1% |
| Moisture | 3.5% max. | 2.8 ± 0.2% |
| Bulk Density | | 21 ± 2 lbs/ft$^3$ |
| Particle Size (thru 200 mesh) | | 91 ± 6% |

The lubricant is preferably present in the range from about 0.1 to 1.0% by weight of the powder blend.

Most preferably, the pellets used in the process of the invention are prepared by using a dolomitic blend of lime having from about 2 to 17% magnesium oxide and 83 to 98% by weight calcium oxide, the lime component making up approximately 75% by weight of the final pellet components. Recyclable EAF dust is added to makeup approximately 24% by weight of the pellet components. Approximately 4 pounds of calcium stearate and pulverized, defibered Kraft paper are added on a 50:50 weight basis to makeup approximately 0.3 to 1% by weight of the pellet components.

Although petroleum coke or other forms of carbon, i.e., coal and graphite, can be added to enhance the thermal and reducing properties of the pellets, the addition of coke or other abrasive carbon sources has been found to detrimentally affect the shock absorbing and handling characteristics of the final product. As a result, the preferred pellets are made without the inclusion of coke or other inert, thermal energy producing components. Even without the presence of coke, the pellet binders of the invention are exothermic in nature and do not detract from the thermal requirements of the furnace process. However, coke/carbon sources can be included and are only limited, in use, by their mechanical properties.

FIG. 1 illustrates the preferred method used to form the pellets of the invention. A dolomitic quicklime is stored in a silo 11 and dispensed through a conveyance means, such as screw conveyor 13 to a weigh hopper 15. In the example shown, the dolomitic quicklime is conveyed at about 400 pounds per minute. The Kraft paper stock is withdrawn from a paper roll 17 and passed to a hammermill shredder 19 where it is pulverized down to the cellulose, longstock paper fiber. The shredded, pulverized paper passes through a blower 21 and through a conduit 23 to a paper cyclone 25. Paper stock from the cyclone 25 passes through an outlet duct 27 to the weigh hopper. In the example shown, the paper stock is fed to the shredder at a feed rate of about 4 pounds per minute.

The EAF dust is stored in a silo 29 and is dispensed through an outlet duct 31 to the weigh hopper 15. The lubricant is dispensed from source 33 through the conduit 35 to the weigh hopper. The mixture is mechanically blended in the weigh hopper for a sufficient time to assure complete and uniform distribution of the paper fibers, calcium stearate, dolomitic lime blend and EAF dust. The uniform mixture is then conducted to a pelletizing machine 39 where the mixture is screw driven into die pockets of about TM inch by 1 inch and Compressed at a pressure of from about 1,000 to 1,800 p.s.i. to produce a pellet (briquette) having high impact strength sufficient to withstand the stresses of conveyance through pneumatic pipelines, elbows and drops to the bottoms of silos while remaining intact and relatively dust free.

In the example of FIG. 1, conveyor belt 41 is used to move the pellets to a conveyance system 41 with the pellets being elevated to a hopper 43 at the rate of about 9.2 tons per hour. The hopper 43 is used to dispense the pellets into storage means such as bags or cartons 45. The bags 45 can then be transported, as by forklifts to a storage area or can be returned to the furnace as a part of the charge stock. In the example shown, one 3,000 pound bag is produced each quarter hour. As an alternative, the pellets may be air-conveyed to a holding silo for injection into the furnace.

The following examples are intended to be illustrative of the invention:

TABLE I

|  | #1 | #2 | #3 | #4 | #5 | #6 |
|---|---|---|---|---|---|---|
| CONSTITUENTS (lb.) | | | | | | |
| HICAL QL | 58.0 | 58.0 | 72.0 | 60.0 | 60.0 | 58.0 |
| DOLO QL | 12.0 | 12.0 | 14.0 | 12.0 | 12.0 | 12.0 |
| COKE | 4.0 | 4.0 | 6.0 | 0.0 | 0.0 | 0.0 |
| EAF DUST | 27.0 | 27.0 | 32.0 | 28.0 | 28.0 | 25.0 |
| PAPER FIBERS | 0.0 | 0.0 | 0.6 | 0.0 | 1.0 | 0.5 |
| LUBRICANT | 0.0 | 0.3 | 0.0 | 0.0 | 0.0 | 0.2 |
| DROP HGT. (ft.) | 2.0 | 3.0 | 5.0 | 3.0 | good | 16.0 |
| COMP'N. (lb.) | 63.0 | 60.0 | 105.0 | 118.0 | n.t. | 182.0 |
| COMMENTS: | brit. | brit. | good | brit. | brit. | excel. |
| % CONSTITUENTS | | | | | | |
| HICAL QL | 57.4 | 57.3 | 57.8 | 60.0 | 59.4 | 60.6 |
| DOLO QL | 11.9 | 11.8 | 11.2 | 12.0 | 11.9 | 12.5 |
| % MgO | 8.6 | 8.6 | 8.2 | 8.3 | 8.3 | 8.6 |
| MET. COKE (% TOTAL WGT.) | 4.0 | 3.9 | 4.8 | 0.0 | 0.0 | 0.0 |
| MET. COKE (% TOTAL LIME) | 5.7 | 5.7 | 7.0 | 0.0 | 0.0 | 0.0 |
| EAF DUST | 26.7 | 26.7 | 25.7 | 28.0 | 27.7 | 26.1 |
| PAPER FIBERS | 0.0 | 0.0 | 0.5 | 0.0 | 1.0 | 0.5 |
| LUBRICANT | 0.0 | 0.3 | 0.0 | 0.0 | 0.0 | 0.2 |

TABLE II

|  | #7 | #8 | #9 | #10 | #11 | #12 |
|---|---|---|---|---|---|---|
| CONSTITUENTS (lb.) | | | | | | |
| HICAL QL | 58.0 | 47.0 | 47.0 | 47.0 | 47.0 | 41.0 |
| DOLO QL | 12.0 | 22.0 | 22.0 | 22.0 | 22.0 | 20.0 |
| COKE | 6.0 | 0.0 | 4.0 | 0.0 | 4.0 | 0.0 |
| EAF DUST | 25.0 | 26.0 | 26.0 | 26.0 | 26.0 | 35.0 |
| PAPER FIBERS | 0.5 | 0.5 | 0.5 | 0.5 | 0.5 | 0.5 |
| LUBRICANT | 0.2 | 0.2 | 0.2 | 0.2 | 0.2 | 0.2 |
| DROP HGT. (ft.) | 4.0 | 7.0 | 4.0 | 7.0 | 4.0 | 10.0 |
| COMP'N. (lb.) | n.t. | 156.0 | 103.0 | 169.0 | 106.0 | 187.0 |
| COMMENTS: | brit. | good shelf life | | | | excel. |
| % CONSTITUENTS | | | | | | |
| HICAL QL | 57.0 | 49.1 | 47.1 | 49.1 | 47.1 | 42.4 |
| DOLO QL | 11.8 | 23.0 | 22.1 | 23.0 | 22.1 | 20.7 |
| % MgO | 8.6 | 16.1 | 16.1 | 16.1 | 16.1 | 16.6 |
| MET. COKE (% TOTAL WGT.) | 5.9 | 0.0 | 4.0 | 0.0 | 4.0 | 0.0 |
| MET. COKE (% TOTAL LIME) | 8.6 | 0.0 | 5.8 | 0.0 | 5.8 | 0.0 |
| EAF DUST | 24.6 | 27.2 | 26.1 | 27.2 | 26.1 | 36.2 |
| PAPER FIBERS | 0.5 | 0.5 | 0.5 | 0.5 | 0.5 | 0.5 |
| LUBRICANT | 0.2 | 0.2 | 0.2 | 0.2 | 0.2 | 0.2 |

TABLE III

|  | #13 | #14 | #15 | #16 |
|---|---|---|---|---|
| CONSTITUENTS (lb.) | | | | |
| HICAL QL | 41.0 | 70.0 | 85.0 | 87.0 |
| DOLO QL | 20.0 | 14.0 | 15.0 | 18.0 |
| COKE | 4.0 | 0.0 | 0.0 | 7.0 |
| EAF DUST | 35.0 | 16.0 | 0.0 | 40.0 |
| PAPER FIBERS | 0.5 | 0.0 | 0.0 | 0.0 |
| LUBRICANT | 0.2 | 0.0 | 0.0 | 0.0 |
| DROP HGT. (ft.) | 4.0 | 4.0 | 3.0 | 7.0 |
| COMP'N. (lb.) | 90.0 | 131.0 | 100.0 | 71.0 |
| COMMENTS: | | | brit. | |
| % CONSTITUENTS | | | | |
| HICAL QL | 40.7 | 70.0 | 85.0 | 52.1 |
| DOLO QL | 19.9 | 14.0 | 15.0 | 10.8 |
| % MgO | 16.6 | 8.3 | 7.6 | 8.6 |
| MET. COKE (% TOTAL WGT.) | 4.0 | 0.0 | 0.0 | 4.2 |
| MET. COKE (% TOTAL LIME) | 6.6 | 0.0 | 0.0 | 6.7 |
| EAF DUST | 34.8 | 16.0 | 0.0 | 24.0 |
| PAPER FIBERS | 0.5 | 0.0 | 0.0 | 0.0 |
| LUBRICANT | 0.2 | 0.0 | 0.0 | 0.0 |

In the above tests, the survival "drop height" in feet is determined by dropping the pellets from various heights onto a cement floor, the height being increased until the pellets break upon impact. The "compression" in pounds is determined by using a hand operated compression tester with the pellets being placed between two parallel plates. A dial indicates the pressure in pounds required to break the pellet.

An invention has been provided with several advantages. While the steel industry has generally recognized the desirability of recycling EAF dust in order to concentrate metal components, direct injection of dust is generally not acceptable because of pollution of the work environment. Pelletizing is desirable because it keeps the heavy metal components of the waste dust in a more controlled state in the melt, minimizing escape of fugitive dust to the work area or environs, and allows the incorporation of all the furnace additives into one additive, if so desired. Various pellet sizes can also be selected to optimize conveyance to the furnace and/or optimize reactivity in the hot molten metal.

The binder ingredients of the invention are exothermic and help to offset any extra power requirements which would be required to break down the pellets. The present pellets are useable instantaneously. Unlike "green ball" pelletizing methods of the prior art, a three day cure period (on the average) is not required or the use of extra heat to calcine the green ball pellets. Where the prior art techniques have achieved 60 pounds of compression strength, the pellets of the invention develop about 150 to 300 pounds compression strength almost immediately. The calcium stearate lubricant has been found to improve inventory shelf life and can be easily blended and mechanically incorporated into the powder blend. The dolomitic lime blend which forms one component of the pellets of the invention provides a metallurgical flux for the iron melt to remove impurities, produce good slagging characteristics and improves refractory life. The calcium stearate component provides lubrication for component feed to the pelletizing operation and also enhances the moisture resistant properties of the produced pellet. The pulverized-long fibered paper stock provides mechanical binding and shock absorbent characteristics to the pellet to enhance handling and storage characteristics.

The arc dust, having been recycled repeatedly, will exhibit a buildup of zinc, lead and chromium concentrations in the subsequently generated arc dust so that the concentrate (generally at least about 20% by weight) may be economically recovered and sold in ingot form. Such a process substantially reduces the need for transfer of the arc dust to a certified landfill which must be monitored for leachate concentrations meeting EPA standards. The invention thus provides a method for recycling waste EAF dust to produce a product having saleable value while sparing the environment of a hazardous waste which must be confined or detoxified, per U.S. EPA regulations at great expense.

While the invention has been shown in only one of its forms, it is not thus limited but is susceptible to various changes and modifications without departing from the spirit thereof.

What is claimed is:

1. A method of recycling metal containing furnace dust contaminated with heavy metals and oxides, the method comprising the steps of:
   preparing a powder blend by blending from about 10 to 40% by weight of the metal contaminated furnace dust with from about 85 to 55% by weight lime, from about 0.1 to 2% by weight paper fiber and from about 0.1 to 4% by weight of a lubricant selected from the group consisting of alkaline earth metal stearates, fatty acids, stearic acid, and paraffin;
   pelletizing the powder blend by mechanically forming the blend into a pellet shape; and
   returning the pellets to the furnace.

2. A method of recycling electric arc furnace dust contaminated with heavy metals and oxides, the method comprising the steps of:
   blending from about 10 to 40% by weight of the metal contaminated furnace dust with from about 85 to 55% by weight of a dolomitic lime blend, from about 0.1 to 2.0% by weight paper fiber and from about 0.1 to 4% by weight of a lubricant selected from the group consisting of alkaline earth metal stearates, fatty acids, stearic acid and paraffin to achieve a uniformly distributed powder blend;
   pelletizing the powder blend by mechanically compressing the blend into pellet-shaped die pockets in a mold at a pressure in the range from about 1000 to 1800 psi; and
   returning the pellets to the furnace.

3. The method of claim 2, wherein the powder blend includes a dolomitic lime blend having a magnesium oxide content of from about 2 to 17% by weight and a calcium oxide content of from about 83 to 98% by weight, the lime component making up approximately 75% by weight of the final powder blend, the metal contaminated furnace dust comprising approximately 24% by weight of the final powder blend, the paper fiber and lubricant comprising from about 0.3 to 4% by weight of the final powder blend.

4. The method of claim 3, wherein the pellets so formed have a compression strength in the range from about 110 to 350 pounds and a drop height of from about 7 to 30 feet.

5. The method of claim 4, wherein the lubricant selected is an alkaline earth metal stearate.

6. A method of recycling electric arc furnace dust contaminated with heavy metals and oxides, the method comprising the steps of:
   blending from about 10 to 40% by weight of the metal contaminated furnace dust with from about 85 to 55% by weight of a dolomitic lime blend, from about 0.1 to 2.0% by weight paper fiber and from about 0.1 to 4% by weight of a lubricant selected from the group consisting of alkaline earth metal stearates, fatty acids, stearic acid and paraffin to achieve a uniformly distributed powder blend;
   pelletizing the powder blend by extruding the blend through an extrusion die to thereby produce a continuous extrusion, the continuous extrusion being subdivided into pellet-shaped increments; and
   returning the pellet-shaped increments to the furnace.

7. A method of recovering metal values from electric arc furnace dust contaminated with heavy metals and oxides including those of zinc, lead, cadmium and chromium, the method comprising the steps of:
   blending from about 10 to 40% by weight of the metal contaminated furnace dust with from about 85 to 55% by weight of a blend of dolomitic lime, from about 0.1 to 2% by weight paper fiber and from about 0.1 to 5% by weight of a lubricant selected from the group consisting of alkaline earth metal stearates, fatty acids, stearic acid, and paraffin to achieve a uniformly distributed powder blend;
   pelletizing the powder blend by mechanically forming the blend into a pellet shape;
   without further curing, conveying the pellets to a storage silo;
   returning the pellets from the storage silo to the furnace;
   continuing to recycle the furnace dust until the zinc concentration within the dust exceeds about 20% by weight of the furnace dust; and
   recovering the zinc in ingot form for resale.

8. The method of claim 7, wherein the powder blend comprises a dolomitic lime blend having a magnesium oxide content of from about 2 to 12% by weight and a calcium oxide content of from about 88 to 98% by weight, the lime component making up approximately 75% by weight of the final powder blend, the metal contaminated furnace dust comprising approximately 24% by weight of the final powder blend, the paper fiber and lubricant comprising from about 0.3 to 4% by weight of the final powder blend.

9. The method of claim 8, wherein the pellets so formed have a compression strength in the range from about 110 to 350 pounds and a survival drop height of from about 7 to 30 feet.

10. The method of claim 9, wherein the lubricant is an alkaline earth metal stearate.

11. The method of claim 10, wherein the pellet components are screw driven into pellet-shaped die pockets having an internal dimension of about 1 inch by ¼ inch.

12. The method of claim 11, wherein the pellets are machine extruded.

* * * * *